Feb. 6, 1934.  S. I. LEVY  1,946,325
TREATMENT OF IRON PYRITES
Filed Feb. 25, 1928
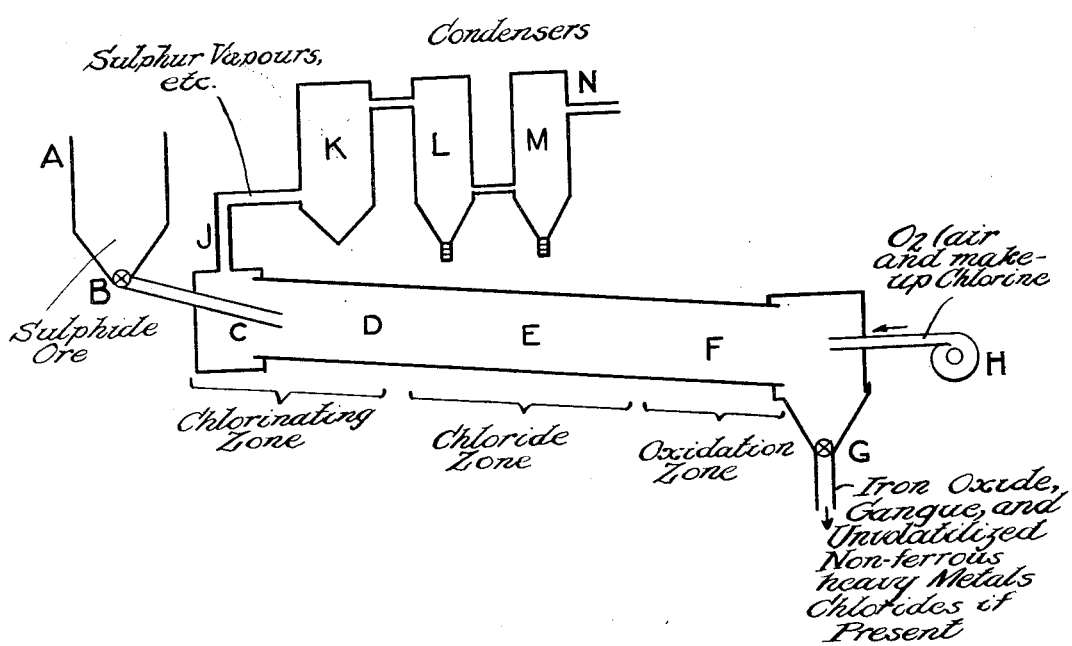

Patented Feb. 6, 1934

1,946,325

UNITED STATES PATENT OFFICE 1,946,325

TREATMENT OF IRON PYRITES

Stanley Isaac Levy, London, England, assignor to Sulphide Corporation, New York, N. Y., a corporation of Delaware Application February 25, 1928, Serial No. 257,097, and in Great Britain February 10, 1928

11 Claims. (Cl. 23—200)

This invention relates to a process for treating pyrites for the recovery of the valuable elements contained therein.

In my U. S. Patent No. 1,891,717, dated December 20, 1932, I have described a process of treating pyrites with chlorine whereby sulphur is driven off and the metals present in the mineral are converted into chlorides. By this process the iron is converted into ferrous chloride.

As is understood, when ferrous chloride is heated in dry air or oxygen, it is converted into a mixture of ferric oxide and ferric chloride, the former being completely non-volatile and the latter completely volatile at a temperature over 300° C. Now it is found that when the vapour of ferric chloride is caused to pass over pyrites at a temperature of 500–1000° C., the mineral is chlorinated in the same way as it is by chlorine itself, the ferric chloride being reduced to ferrous chloride which can be again treated with dry air or oxygen to form ferric oxide and ferric chloride. The use of dry air or oxygen to oxidize the ferrous chloride to ferric chloride eliminates any moisture being admitted and gives an anhydrous ferric chloride which reacts with the pyrites to form an anhydrous ferrous chloride. By the practical application of these reactions, I now propose to convert pyrites completely to brimstone, ferric oxide and the chlorides of copper, zinc and lead by chlorination followed by treatment with dry air or oxygen, or, more simply, by passing dry air with a small proportion of chlorine, namely that required to form the chlorides of copper, zinc and lead, over pyrites already partly chlorinated, or merely mixed with a suitable chloride, such as ferrous chloride, sodium chloride, calcium chloride, magnesium chloride etc., and heated to a temperature of 500–1000° C. Once a zone of chloride reaction has been established, pyrites unmixed with any other substance may be fed into the furnace, and air with a small proportion of chlorine caused to pass therethrough in counter-current.

My present invention may thus be regarded as consisting in a process of treating pyrites by effecting alternate conversion of the iron disulphide of the pyrites to ferrous chloride, and of ferrous chloride to ferric chloride and ferric oxide, reacting on the pyrites with the ferric chloride and recovering sulphur and non-ferrous chlorides.

So far as concerns the treatment of the iron disulphide in the pyrites the reaction thus consists in effect in the alternate chlorination of the disulphide, $$8FeCl_3 + 4FeS_2 = 12FeCl_2 + 8S,$$

and oxidation of ferrous chloride,

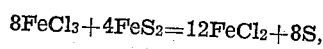

and the net result of these changes may be expressed as a simple oxidation of iron disulphide with the formation of brimstone and ferric oxide, according to the equation:

$$4FeS_2 + 3O_2 = 2Fe_2O_3 + 8S + 248K$$

The equation given above for the oxidation of ferrous chloride does not take into consideration secondary reactions which, as is well known, always accompany such oxidation. It is also only one example of the oxidation of ferrous chloride, as the conditions under which the oxidation takes place determine the particular reaction. Under certain conditions the reaction may also be expressed by the following equations:

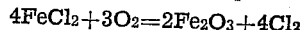

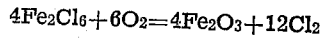

In the oxidation of ferrous chloride according to the equation first given, i. e.

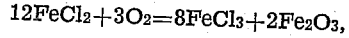

the ferrous chloride itself may be either partly or wholly oxidized to form ferric oxide and free Cl. It will thus be seen that regardless of which equation represents the oxidation which actually takes place, free chlorine will be formed as well as ferric chloride.

The oxidation of the iron disulphide as expressed above is exothermic, so that little fuel is required once the required temperature has been reached. The selected temperature may be maintained by regulating the rate of admission of air, and by controlling the supply of fuel to the furnace in known manner.

I may carry out these reactions at any suitable temperature between 500 and 1000° C; 700–800° C. is a suitable range for driving off from the furnace the volatile chlorides of zinc and lead. By a suitable arrangement of condensers, I may cause the zinc and lead chlorides to condense substantially free from sulphur in the first receivers, the bulk of the sulphur to condense in the liquid condition in the middle receivers, and the remainder of the sulphur, with any impurities, in the last receivers. By drawing off the liquid sulphur into settling vessels, and allowing it to overflow into suitable coolers, I obtain the bulk of the sulphur in a pure form. The zinc and lead chlorides may be treated in suitable manner for separation and recovery of the metals.

The iron oxide obtained as the solid product from the furnace is leached with water and/or dilute acid and/or other aqueous solution to remove the copper and any other suitable chlorides in solution, from which the metals may be recovered in suitable manner.

I may carry out this process in a single furnace, forming a zone of ferrous chloride by a preliminary treatment with chlorine gas at 600–900° C.,

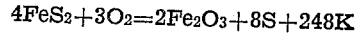

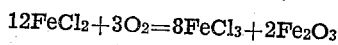

and causing pyrites to pass through the furnace from one end, and drawing a current of air, with the necessary quantity of chlorine to form the chlorides of zinc, lead and copper, through the furnace from the other end in counter-current to the pyrites.

Alternatively, I may use two or more furnaces, in one or more of which I carry out the oxidation of ferrous chloride, and in another or others the chlorination of the pyrites by means of the ferric chloride so obtained. Thus, I may treat pyrites with chlorine to form ferrous chloride in a first furnace, and then pass air with the necessary proportion of chlorine through such furnace at 200°–500° C. in order to form ferric chloride and ferric oxide, allowing the ferric chloride to distil over and condense, and redistil the ferric chloride through fresh pyrites contained in a second furnace there to form ferrous chloride. The liberated sulphur distils from the second furnace together with the volatile chlorides of lead and zinc, leaving behind the ferrous and copper chlorides. Air is passed at a lower temperature over the ferrous chloride in the second furnace or in a third furnace to which the ferrous chloride may have been transferred in liquid condition, and the ferric chloride formed distilled into the first furnace from which meanwhile the ferric oxide has been discharged, and replaced by fresh pyrites. This series of operations may be repeated indefinitely. In this way I avoid the presence of large quantities of nitrogen, etc., during the chlorination of the pyrites by means of ferric chloride, and also prevent the possibility of free oxygen coming into contact with pyrites.

After the first supply of chlorine to form sufficient ferrous chloride to start the series of reactions, I consume only the chlorine required to replace that consumed in the formation of the chlorides of zinc, lead, and copper, which constituents are obtained as chlorides by my process; the iron of the pyrites is obtained as ferric oxide and the sulphur in elemental condition.

The drawing shows an arrangement of apparatus suitable for carrying out the process in one furnace. A is the feed hopper, from which the sulphide material is fed at a controlled rate by the sealing device B to one end C of a suitable furnace CDEF, which may be a rotating cylindrical furnace, or a stationary furnace through which the charge is caused to pass by means of conveyors, rabbles, or by other suitable means. The material passing through the furnace from C to F is first chlorinated in zone CD by the chlorinating gases passing through the furnace in the direction from F to C. The sulphur driven off in this zone is carried off by the gases and leaves the furnace at J. The middle zone E of the furnace is the chloride zone. The zone F is the oxidation zone, in which the chlorides coming from E meet the oxidizing gases blown into the furnace by fan H; the oxide product leaves the furnace through sealing device G, and the chlorinating gases formed as a result of oxidation of the chlorides in zone F pass through the furnace towards zone D, at which they come into reaction with the fresh sulphide material entering the furnace at C.

The gases carrying the sulphur pass from the furnace at J through suitable dust chambers K to condensers L, M, whence the inert gases escape to atmosphere at N.

If the chlorinating and oxidizing steps are carried out separately in different furnaces, a similar arrangement to the above may conveniently be employed for the chlorination stage, the chorinating medium in gaseous form being then admitted at F by means of fan H; these gases will in this case be derived from the oxidizing furnace, which is supplied with the chlorinated solid product from the chlorinating furnace, and with a gaseous oxidizing medium.

Whilst the above represents one arrangement of apparatus in which the invention may be carried out, it is to be understood that the invention is not limited to this or to any apparatus, but that any convenient form of furnace and arrangement of plant may be employed.

I claim:

1. In the recovery of sulphur from materials containing iron sulphide, the process which comprises supplying such materials to a chlorinating zone, chlorinating iron present therein to ferrous chloride with chlorinating gases, removing liberated sulphur as a vapour, then oxidizing the ferrous chloride formed and leading chlorinating gases formed in the oxidizing reaction to the chlorinating zone to chlorinate additional iron sulphide-containing material introduced thereto.

2. A cyclic process of treating sulphide materials containing iron for the recovery of sulphur, of ferric oxide and of non-ferrous metals in the form of chlorides consisting in alternately chlorinating the material to liberate free sulphur and form metal chlorides containing ferrous chloride and oxidizing the ferrous chloride in such metal chlorides by means of air by heating at an elevated temperature to form ferric oxide and ferric chloride and chlorinating further quantities of such sulphide material by means of such ferric chloride.

3. A proces of treating sulphide material containing iron which comprises forming a zone of ferrous chloride in a furnace and supplying sulphide material in one direction to this zone and air containing a proportion of chlorine gas in the opposite direction, said air and chlorine gas being supplied at such a rate as to insure the displacement of the sulphur content of said sulphide material in elemental form, while maintaining a temperature in said ferrous chloride zone sufficient to cause said ferrous chloride to react with the incoming air and chlorine to produce chlorinating gases which will react upon the sulphide material introduced to said zone to displace the sulphur content thereof in elemental form and to produce ferrous chloride from the iron contained therein.

4. A process of treating sulphide material containing iron which comprises treating such material with a chlorinating gas to form ferrous chloride and displace the sulphur content thereof in elemental form, oxidizing the ferrous chloride to form ferric chloride and ferric oxide and distilling the resultant ferric chloride through further sulphide material.

5. A process of treating sulphide material containing iron which comprises chlorinating such material to form anhydrous metal chlorides containing ferrous chloride, and oxidizing the ferrous chloride in such anhydrous chlorides by means of a dry gaseous oxidizing medium at temperatures in the region of 600–1000° C. to form ferric oxide and a mixture of ferric chloride vapour and chlorine.

6. A process of treating sulphide material containing iron which comprises chlorinating such material to form anhydrous metallic chlorides containing ferrous chloride, oxidizing the ferrous chloride in such anhydrous chlorides by means of a dry gaseous oxidizing medium at temperatures in the regions of 250–500° C., to form ferric oxide and ferric chloride vapour, and treating such ferric chloride vapour with dry air or oxygen at temperatures in the region of 600–1000° C., to form ferric oxide and a mixture of chlorine and ferric chloride vapour.

7. A cyclic process of treating sulphide materials containing iron for the recovery of sulphur in elemental form and of ferric oxide, which comprises chlorinating such material to liberate free sulphur and convert the iron contained therein to ferrous chloride, removing the liberated sulphur as vapour, oxidizing the ferrous chloride by means of a dry gaseous oxidizing medium at temperatures in the region of 600–1000° C. to form ferric oxide and a mixture of ferric chloride vapour and chlorine, and chlorinating further quantities of such sulphide materials by means of such mixture of ferric chloride vapour and chlorine.

8. A cyclic process of treating sulphide materials containing iron for the recovery of sulphur in elemental form and of ferric oxide, which comprises chlorinating such material to liberate free sulphur and convert the iron contained therein to ferrous chloride, removing the liberated sulphur as vapour, oxidizing the ferrous chloride by means of a dry gaseous oxidizing medium at temperatures in the region of 250–500° C. to form ferric oxide and ferric chloride vapour, then treating such ferric chloride vapour with a dry gaseous oxidizing medium at temperatures in the region of 600–1000° C. to form ferric oxide and a mixture of chlorine and ferric chloride vapour, and chlorinating further quantities of such sulphide materials by means of such mixture of ferric chloride vapour and chlorine.

9. In the treatment of sulphide material containing iron for the recovery of elemental sulphur and other valuable substances therefrom, the steps which comprise treating such material with ferric chloride vapours at a temperature in the region of 500–1000° C. to form ferrous chloride and displace the sulphur content thereof in elemental form, removing the liberated sulphur as vapour in admixture with other substances present and volatilizable at the temperature employed, and separating the sulphur from such other substances.

10. In the treatment of sulphide materials containing iron for the recovery of valuable elements therefrom, the steps which comprise treating such a material with a gaseous chlorinating agent in the amount required to convert the iron to ferrous chloride, while maintaining a temperature sufficient to cause the reaction of the chlorinating agent with the ore, and then oxidizing the ferrous chloride thus formed by treating the same with an oxygen-containing gas at an oxidizing temperature to obtain therefrom mixtures of chlorine and ferric chloride vapour suitable for chlorinating further quantities of sulphide material.

11. In the treatment of sulphide material containing iron for the recovery of elemental sulphur and other valuable substances therefrom, the steps which comprise treating such a material with ferric chloride vapours in an amount just sufficient to convert the iron to ferrous chloride, while maintaining a temperature sufficient to cause the ferric chloride to react with said material, to form ferrous chloride and displace the sulphur content thereof in elemental form, and removing the liberated sulphur as vapours of elemental sulphur.

STANLEY ISAAC LEVY.